(12) United States Patent
Cotter

(10) Patent No.: US 7,812,716 B1
(45) Date of Patent: Oct. 12, 2010

(54) SEAT BELT STATUS EXTERNAL MONITORING APPARATUS AND METHOD

(76) Inventor: William D. Cotter, 137 Queens Grant La., Fairfield, CT (US) 06824

( * ) Notice: Subject to any disclaimer, the term of this patent is extended or adjusted under 35 U.S.C. 154(b) by 349 days.

(21) Appl. No.: 11/821,354

(22) Filed: Jun. 22, 2007

(51) Int. Cl.
*G08B 21/00* (2006.01)

(52) U.S. Cl. .................. 340/457.1; 340/468; 340/573.1; 340/667

(58) Field of Classification Search ............. 340/457.1, 340/457, 438, 425
See application file for complete search history.

(56) References Cited

U.S. PATENT DOCUMENTS

| | | | |
|---|---|---|---|
| 3,875,556 A * | 4/1975 | Beaird .................... 340/457.1 |
| 4,849,733 A * | 7/1989 | Conigliaro et al. ....... 340/457.1 |
| 6,215,395 B1 * | 4/2001 | Slaughter et al. ......... 340/457.1 |
| 6,362,734 B1 * | 3/2002 | McQuade et al. ........ 340/457.1 |
| 6,448,907 B1 | 9/2002 | Naclerio .................... 340/945 |
| 7,283,043 B1 * | 10/2007 | Harrison .................. 340/457.1 |
| 2004/0119599 A1 * | 6/2004 | Stevenson et al. ........ 340/686.1 |
| 2005/0156726 A1 * | 7/2005 | Rubel ...................... 340/457.1 |

* cited by examiner

*Primary Examiner*—George A Bugg
(74) *Attorney, Agent, or Firm*—Lorusso & Associates

(57) ABSTRACT

An apparatus and method for monitoring seat belt use in a vehicle from the exterior of the vehicle is provided. Seat belt use indicator lights are positioned on the exterior of a vehicle and wirelessly connected to or hardwired to sensors located in seat belt buckle assemblies to provide information about the use of the seatbelt. One or multiple indicator lights grouped in cluster arrangements to simulate the seat arrangement in a vehicle can be implemented. The apparatus may also be used in aircraft to monitor seat belt use remotely from within the aircraft.

16 Claims, 22 Drawing Sheets

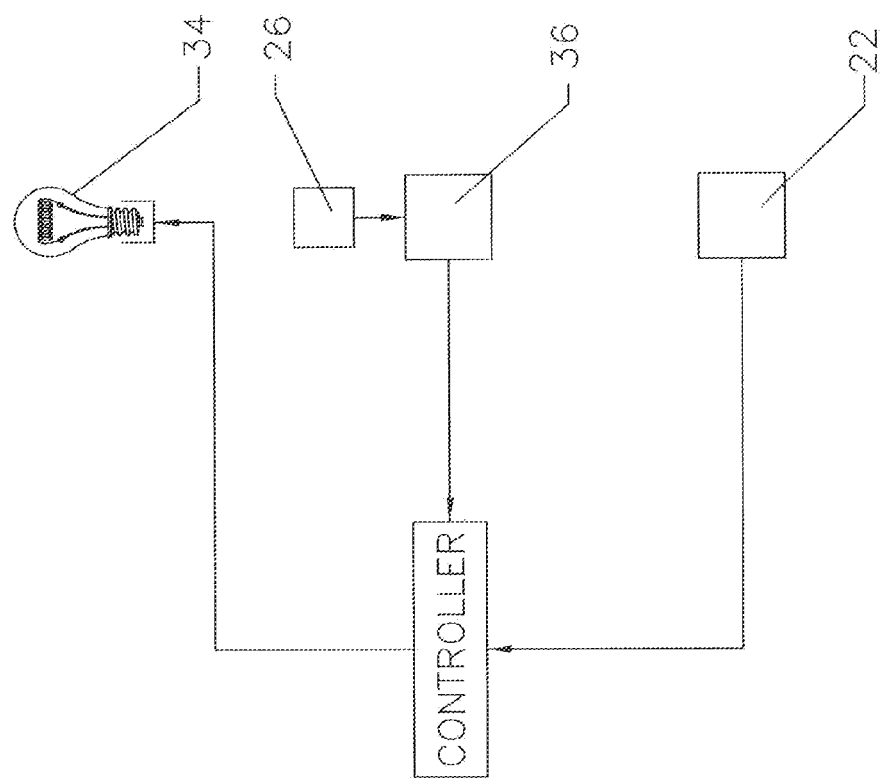

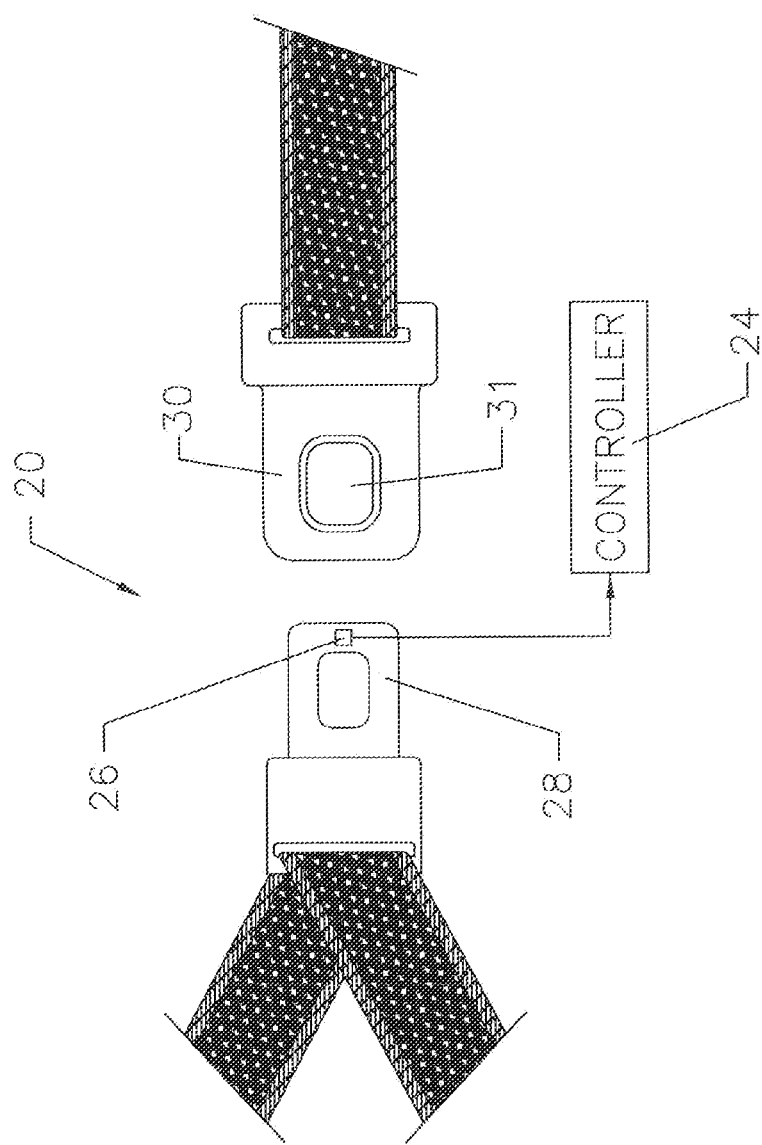

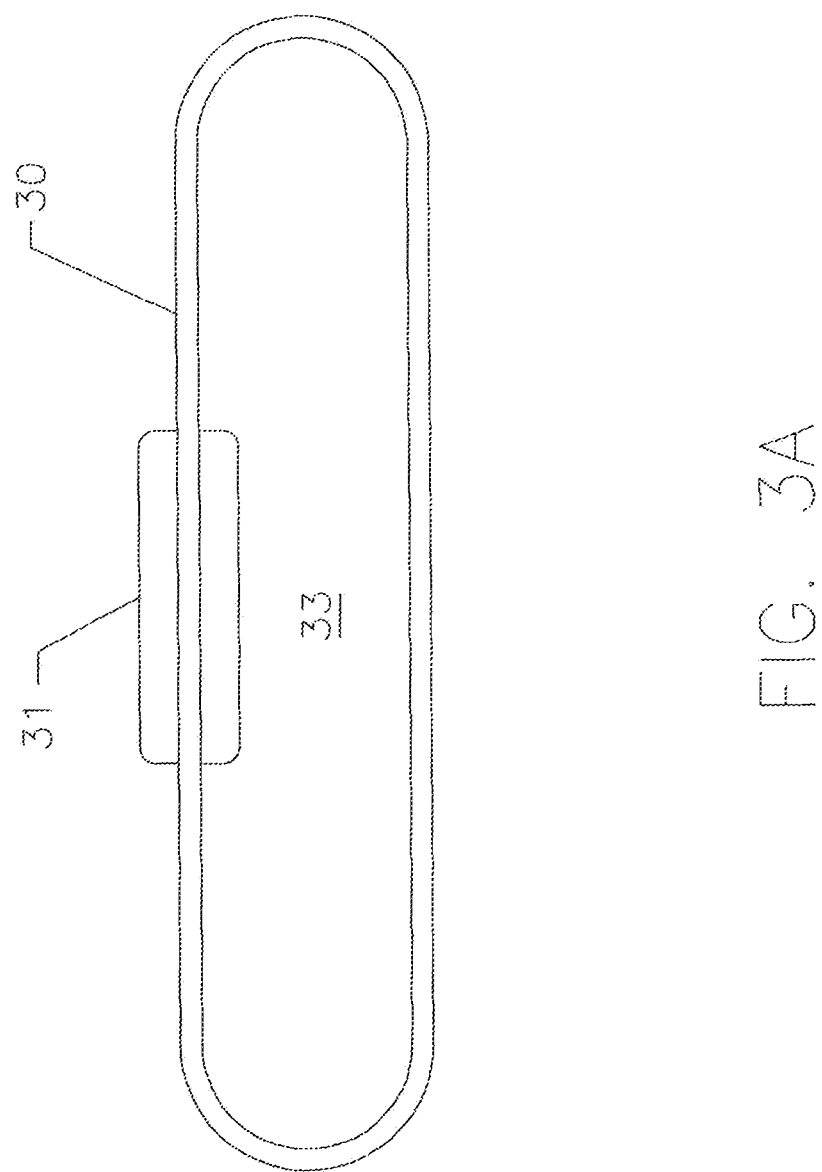

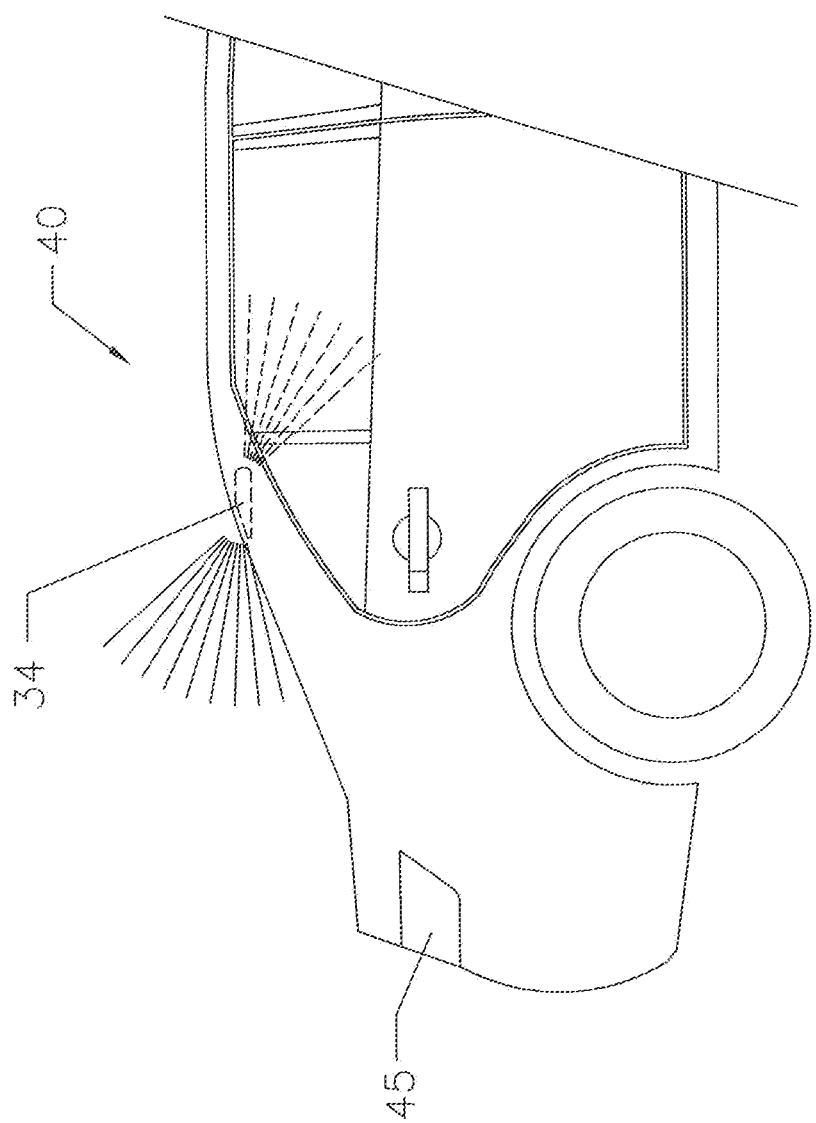

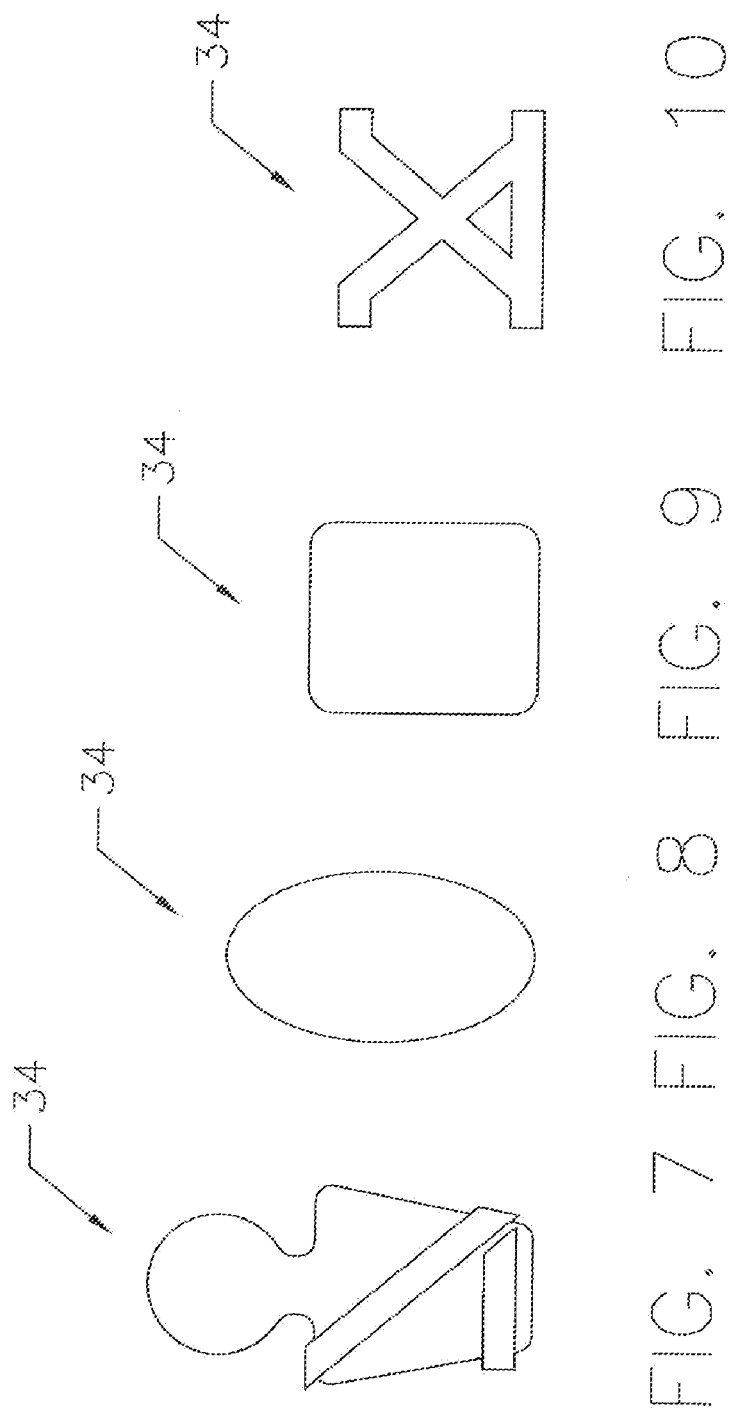

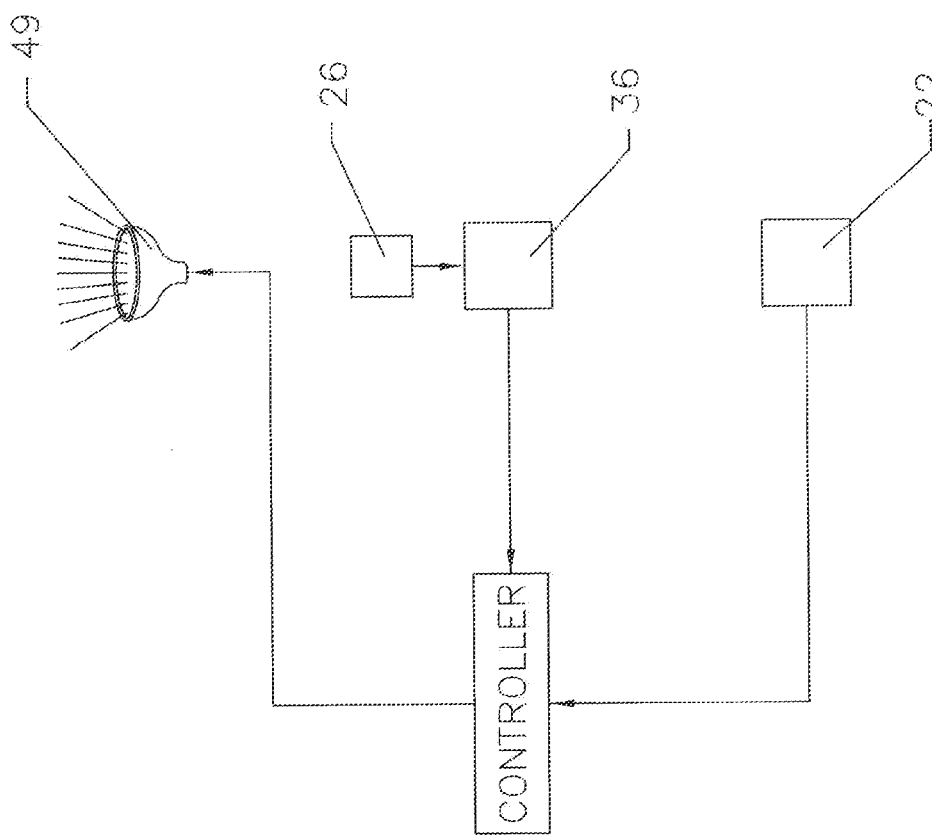

SEAT BELT STATUS EXTERNAL MONITORING APPARATUS AND METHOD

CROSS REFERENCE TO RELATED APPLICATIONS

None

BACKGROUND OF THE INVENTION

The present disclosure relates to a method and apparatus for monitoring the use of seat belts (also known as seat restraints, and passenger restraints) in all types of motorized vehicles. More particularly, the present disclosure relates to a method and apparatus for monitoring from the exterior of a motor vehicle, the use of seat belts in the vehicle.

DESCRIPTION OF THE ART

As of July, 2003, at least twenty-one states and the District of Columbia have primary safety belt laws with varying requirements. States with primary enforcement (the authorization to issue seat belt tickets with or without other violations), have a 78% seat belt use compliance rate. The National Highway Traffic Safety Administration (NHTSA) estimates that states with secondary enforcement (the authorization of law enforcement to issue a seat belt ticket only if a vehicle is pulled over for a primary offense, e.g., speeding), have a 63% seat belt use compliance rate. The NHTSA further estimates that if the compliance rate were increased to 90%, 5,536 fatalities and 132,670 injuries could be avoided.

A problem faced by all law enforcement officials is a diminished ability to ascertain whether the occupants of a moving vehicle are in compliance with state seat belt laws. Automobiles come in a wide variety of shapes and sizes and window tints that make seat belt use monitoring very difficult. Often times when a law enforcement officer approaches the driver of a vehicle pulled over for a traffic violation, the driver has already unbuckled the seat belt to retrieve the vehicle registration from the glove compartment or other vehicle compartment. The status of seat belt use by other vehicle occupants just prior to the stop may be equally unverifiable after the stop.

Many systems have been devised to provide a vehicle driver with information about the status of seat belt use of other vehicle occupants. For example, many vehicles have electronically-implemented systems that incorporate dash board lights or sound devices that emit warning sounds that become activated when a seat is occupied but the corresponding seat belt is not properly fastened or in an unlatched condition. Some systems provide seat-specific information while others simply inform the driver that one or more seatbelts may not be in use. None to the knowledge of the inventor provides seat belt status information outside the vehicle. What is needed and desired is a system to monitor seat belt usage compliance from the exterior of a vehicle.

SUMMARY OF THE INVENTION

In one aspect of the present disclosure, a seat belt monitoring system is provided that includes exterior lights positioned on the exterior of a vehicle. The lights can be directly connected to seat belt use detection devices positioned in one or more seat belts of the vehicle. Alternatively, the lights can be connected to a central processing system that uses information received from the seat belt use detection devices to control operation of the exterior lights.

In another aspect of the present disclosure, the exterior lights are wirelessly connected, e.g., via radio frequency communication, to either the individual seat belt use detection devices or the central processing system. The lights can be configured to light when a user is in compliance or when a user is not in compliance. The setting can be adjusted and/or modified to conform to prevalent federal and state laws and regulations.

In another aspect of the present disclosure, a single light is provided on the exterior of a vehicle to indicate whether any of a plurality of vehicle occupants is not using a seat belt. In yet another aspect of the disclosure, a plurality of lights is provided in a cluster arranged to correspond to the vehicle's seat arrangement so that seat belt use compliance for each seat can be monitored with specificity.

To eliminate the possibility of a false indication of seat belt use, each seat is provided with a sensor that sends a signal to a central processing system to indicate seat use status. The seat use status signal is compared to the seat belt use detection device signal to ensure that a correct signal is sent to the particular exterior light.

Aesthetically pleasing designs may be employed to complement the light packages currently used on vehicles. Alternatively, specific symbols may be employed to comply with any federal, state and/or local laws and/or regulations. There may be only one light to indicate a violation or a cluster of lights that specify which seat occupant is out of compliance.

In a further aspect of the present disclosure, a seat belt monitoring system is applied to the seats of an aircraft (private or commercial passenger or military), and connected to a central monitoring console where the aircraft crew can monitor seatbelt usage. These and other aspects of the disclosure will become apparent from a review of the appended drawings and the detailed description.

BRIEF DESCRIPTION OF THE DRAWINGS

FIG. 2A is a schematic illustration of a vehicle seat belt use detection system including an external indicator light according to another embodiment of the disclosure.

FIG. 3 shows a seat belt buckle assembly with a buckle engagement sensor according to one embodiment of the disclosure.

FIG. 3A shows a seat belt buckle according to one embodiment of the disclosure.

FIG. 6B shows a side view of the rear portion of a vehicle with the seat belt use light positioned in the upper field of the rear window according to a further embodiment of the disclosure.

FIG. 7 shows a seat belt use light according to one embodiment of the disclosure.

FIG. 8 shows a seat belt use light according to another embodiment of the disclosure.

FIG. 9 shows a seat belt use light according to a further embodiment of the disclosure.

FIG. 10 shows a seat belt use light according to yet another embodiment of the disclosure.

FIG. 19 is a schematic illustration of a vehicle seat belt use detection system including an externally audible indicator horn according to another embodiment of the disclosure.

DETAILED DESCRIPTION OF THE INVENTION

Figure 1:
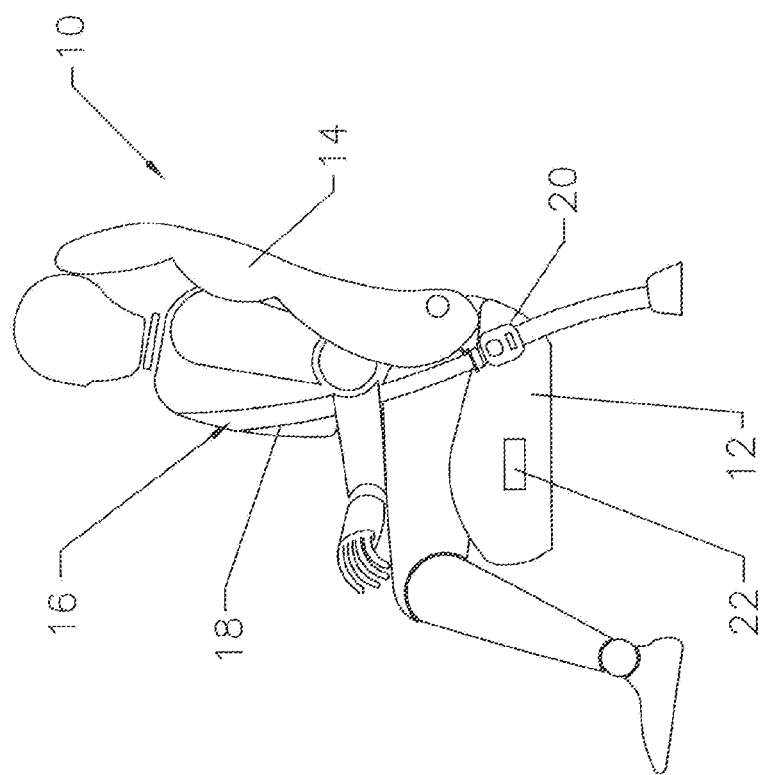
FIG. 1 is a schematic illustration of a passenger-occupied seat and a vehicle seat belt use detection system according to one embodiment of the present disclosure.

Referring to the drawings and, in particular, FIG. 1, one aspect of the present disclosure provides a vehicle seat assembly for an automobile shown generally as reference numeral 10. Seat assembly 10 includes a seat 12 connected to a back rest 14. An extendable and retractable seat belt 16 is appended to seat assembly 10 and includes a seat belt strap 18 and a buckle 20.

In one aspect of the disclosure, embedded in seat 12 is a sensor 22 that detects force being exerted on seat 12 in the form of downward pressure derived from placement of an object or person on seat 12. Sensor 22 may be calibrated to detect a specific range of weights representative of the downward pressure sensed or may be configured to detect any pressure above a threshold level, which may be as low as 0.

In an alternate aspect, an infra red sensor is used to detect the presence of a person in a seat. The infra red sensor may be incorporated into seat 12, seat back 14 or placed in a section of the automobile adjacent to the seat to which the sensor is associated, such as the dash board for the front seats. As an illustrative non-limiting example, with respect to a right back passenger seat in an automobile, the infra red sensor associated with that seat may be placed in the set back portion 14 of the right front seat and focused toward the right back seat to detect occupancy of that seat. As with the pressure sensor, the sensor sends a signal via hardwire or wirelessly to a central controller 24 (shown in FIG. 2 described below) for coordination with the seat belt status sensor.

Figure 2:
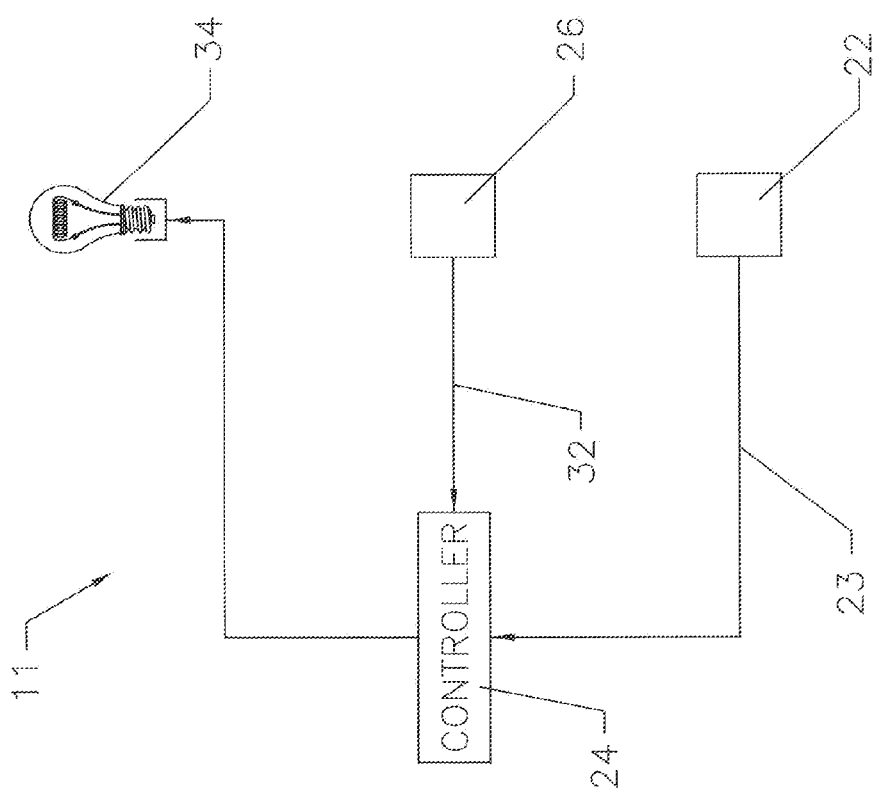
FIG. 2 is a schematic illustration of a vehicle seat belt use detection system including an external indicator light according to one embodiment of the disclosure.

Referring to FIG. 2, a seat belt use monitoring system 11 is shown. System 11 includes sensor 22, which sends a signal 23 to controller 24. The signal sent to controller 24 is processed by the controller to determine the seat status of the seat from which the signal is received. As use herein, "seat status" shall mean the condition of a vehicle seat as being occupied or unoccupied. Controller 24 may be a computer, microprocessor, a set of integrated circuits or a series of separate components, each of which performs one or more functions to determine whether a seat is occupied.

Referring to FIGS. 1-3A, a seat belt use monitoring system 11 includes a seat belt buckle assembly, which includes a seat belt tongue 28 and a seat belt receiving buckle 30. Buckle 30 includes a buckle aperture 33 configured to receive tongue 28 in releasably locking engagement. Buckle 30 also includes a release button 31 for releasably locking tongue 28 to buckle 30 as is conventional in the art. Tongue 28 is formed with an aperture 29 dimensioned to receive release button 31.

Seat belt buckle switch 26 is positioned on a seat belt tongue 28 to determine the latch status of the seat belt buckle. As used herein, "latch status" shall mean the condition of the seat belt in a latched or unlatched condition. In one embodiment, switch 26 may be a component of a circuit that is completed when tongue 28 is engaged positively within a receiving buckle 30 when release button 31 releasably engages tongue 28. Alternatively, a micro switch can be used to detect tongue 28 engagement. The micro switch is in an open condition when tongue 28 is not engaged. Insertion of tongue 28 into buckle 30 causes tongue 28 to come into physical contact with the micro switch, which is urged into a closed position when tongue 28 is positively engaged with buckle 30 in a latched condition. Switch 26 may be positioned in buckle 30 so as to be depressed or activated only upon complete and proper engagement of tongue 28 with buckle 30. For example, switch 26 may be positioned at the most distal point of buckle aperture 33 so that only full insertion of tongue 28 will result in switch 26 activation.

Once switch 26 is activated, a signal 32 is sent via hardwire to controller 24. Controller 24 processes the signal 32 along with any signal 23 received from sensor 22 to determine seat status and seat belt usage. If a seat is occupied and the corresponding seat belt is properly engaged, controller 24 activates (either via hard wire or wirelessly as described below) an exterior light 34. Exterior light 34 may have one of two setting, each with two optional meanings: on, which can signify that the seat belt is engaged or not engaged and off, which can signify that the seat belt is engaged or not engaged. Optionally, a vehicle may include an additional switch to enable a user to deactivate the seat belt monitoring system. The switch may be incorporated into the functions of controller 24 and allow for the selective deactivation of one or more seats.

In an alternate aspect, seat belt switch 26 is wirelessly connected to controller 24 via Bluetooth, RF or other wireless protocol as is known in the art. In this aspect, a transmitter (not shown) is connected directly to switch 26 such that the transmitter sends a signal to a receiver and antenna assembly (not shown) in controller 24. In a further alternative aspect shown in FIG. 2A, switch 26 sends signal 32 to a seat belt use sensor 36, which includes a transmitter that sends a signal 39 to controller 24. To generate an electrical signal, switch 26 may be coupled with a piezoelectric element such at that shown and described in U.S. Pat. No. 6,259,042, the contents of which are incorporated herein by reference.

The same configuration may be used to wirelessly connect controller 24 to light 34. Light 34 is connected directly to the vehicle's electrical system and may include a switch local to the light for activation. The signal received from controller 24 operates the switch. Alternatively, the switch may be located remote from the light, including integrated with controller 24.

Figure 4:
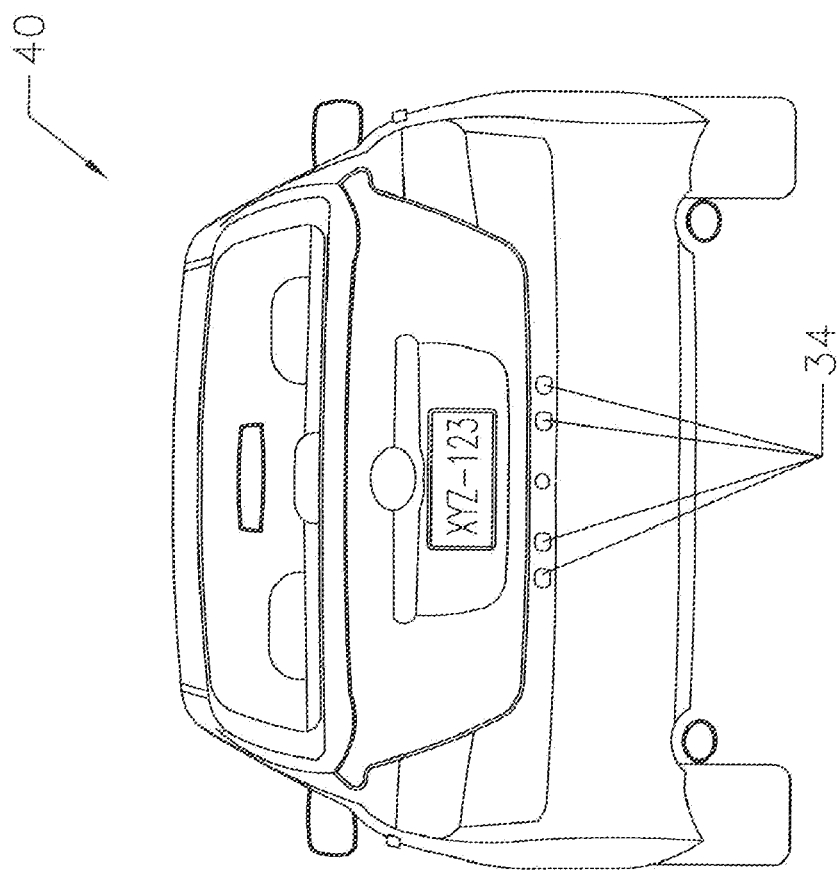
FIG. 4 shows a trunk section of a vehicle with seat belt use lights according to one embodiment of the disclosure.
Figure 5:
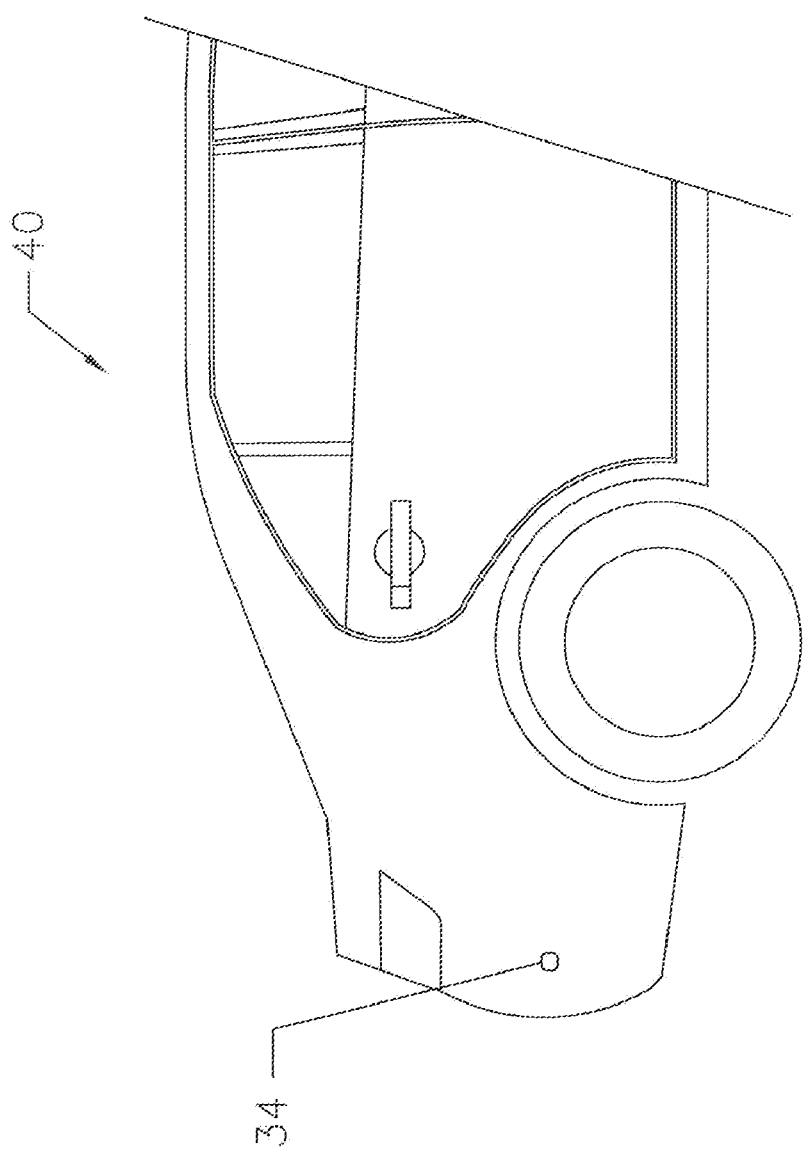
FIG. 5 shows a side view of a trunk section of a vehicle with seat belt use lights positioned on a side back quarter panel according to another embodiment of the disclosure.
Figure 6:
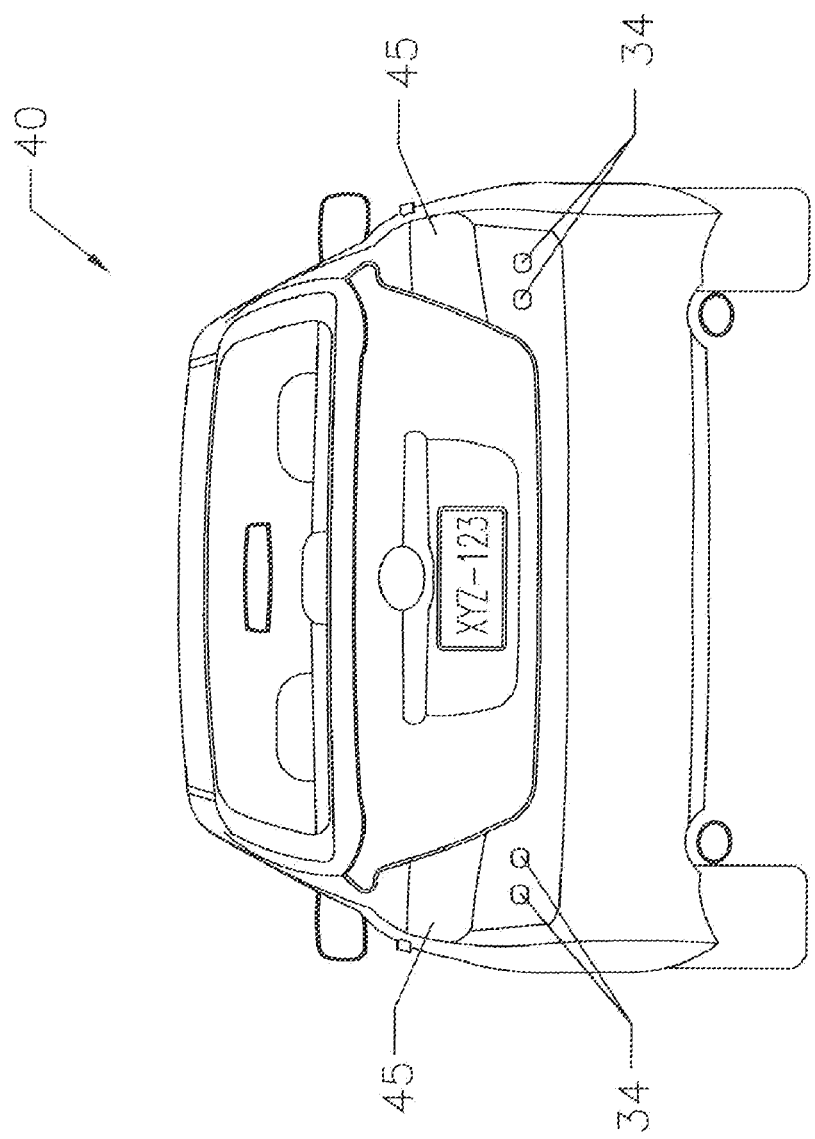
FIG. 6 shows a trunk portion of a vehicle with seat belt use lights according to yet another embodiment of the disclosure.
Figure 6A:
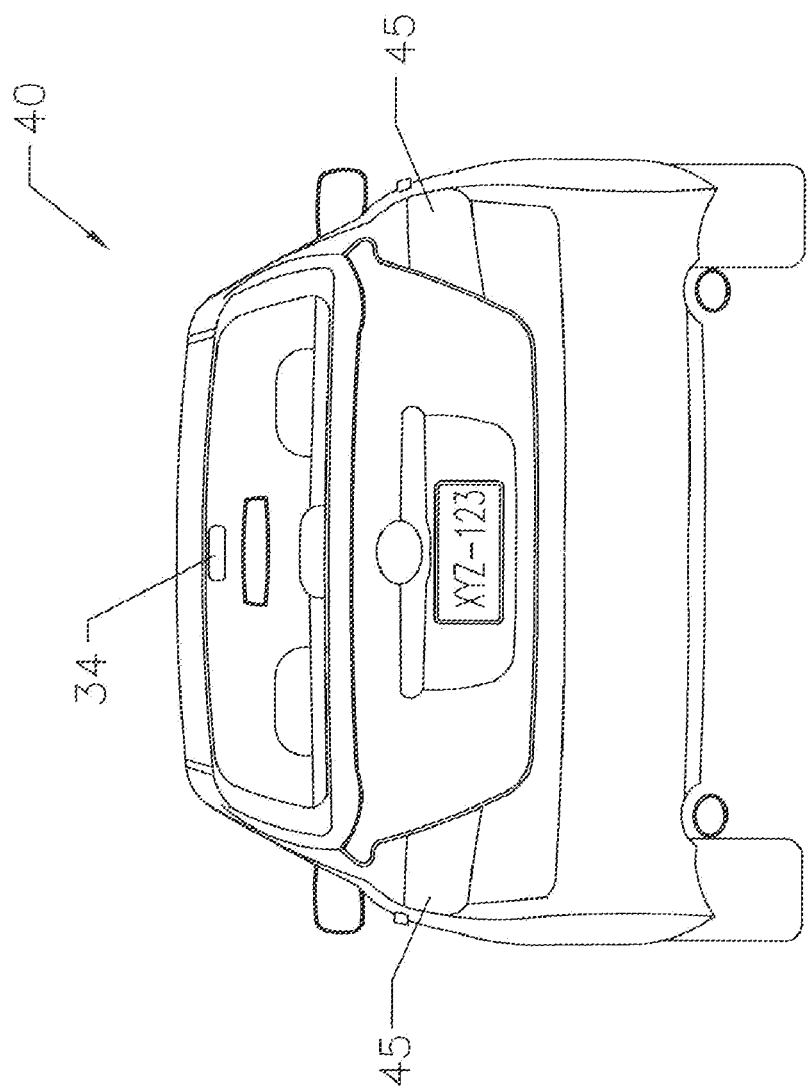
FIG. 6A shows a trunk portion of a vehicle with the seat belt use light positioned in the upper field of the rear window according to another embodiment of the disclosure.
Figure 6C:
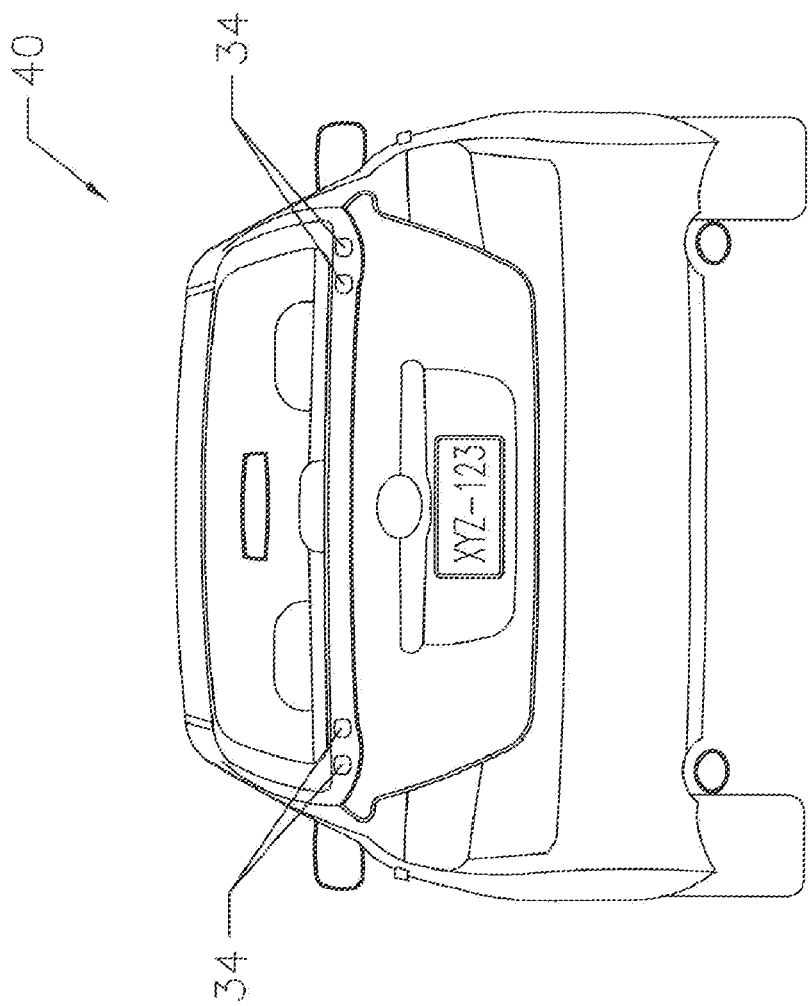
FIG. 6C shows a trunk portion of a vehicle with the seat belt use lights positioned above the trunk lid according to a still further embodiment of the disclosure.
Figure 6D:
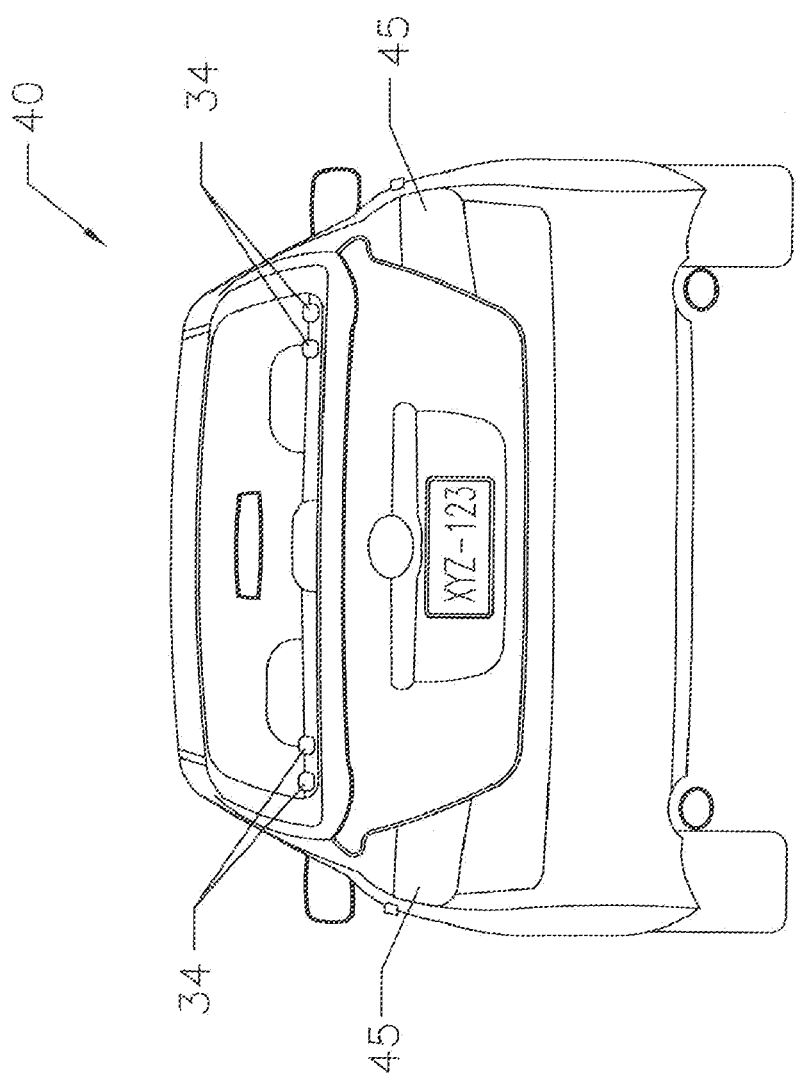
FIG. 6D shows a trunk portion of a vehicle with the seat belt use lights positioned in a lower field of the rear window according to a yet further embodiment of the disclosure.

Referring to FIGS. 4-6, a vehicle, shown generally as 40, includes one or more exterior seat belt status lights 34 placed in a variety of locations and arrangements. In FIG. 4, lights 34 are shown affixed to the rear center of the vehicle below a trunk of the vehicle. In FIG. 5, lights 34 are shown affixed to the distal end of a rear quarter panel of vehicle 40. In FIG. 6, lights 34 are separated into two sets, a right and a left set, to correspond to the seat locations being referenced by the lights. In FIG. 6A, light 34 is positioned in the field of the rear window and can be configured to flash simultaneously inside and outside the vehicle, as shown in FIG. 6B, to provide internal and external notification of seat belt use status. In FIG. 6C, lights 34 are positioned above the trunk lid and separated into two sets, a right and a left set, to correspond to the seat location being referenced by the lights. In FIG. 6D, lights 34 are positioned similarly to those in FIG. 6C, except the sets are situated in the lower field of the rear window.

It should be understood and apparent that light configurations shown are for illustrative purposes only and that any combination of light configurations may be possible, including redundant sets placed on the rear, sides and/or front of vehicle 40 so as to allow seat belt use monitoring to take place from a variety of viewing angles from the exterior of the vehicle. It should also be understood and apparent that lights 34 may be any of a variety of types including incandescent, halogen, ultra violet, infrared and the like.

Figure 11:
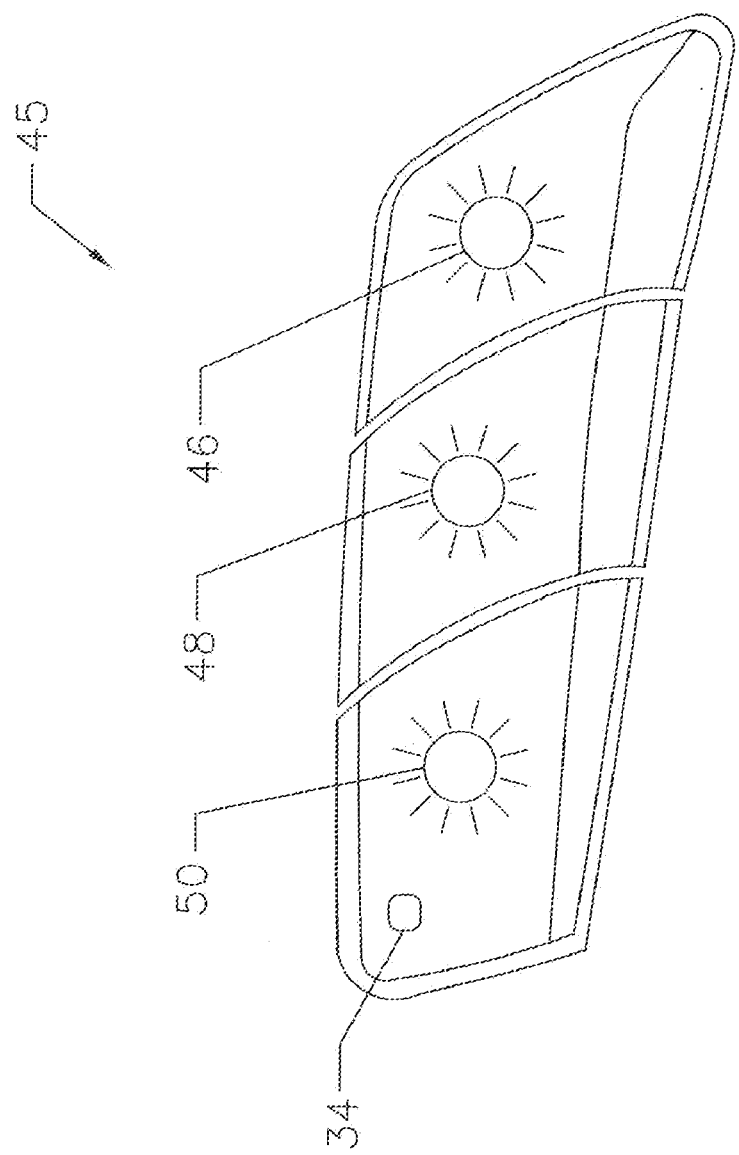
FIG. 11 shows an automobile tail light assembly with a seat belt use status light integrated into the assembly according to an alternate embodiment of the disclosure.

As a further alternative, lights 34 may be integrated into existing exterior light assemblies as shown in FIG. 11. Exterior light assembly 45 includes brake light 46, reverse light 48, and parking light 50. Lights 34 may be further modified to function as strobe or flashing lights to make more conspicuous and improve visibility when a seat belt is not properly engaged. To further differentiate lights 34 from other vehicle lights, lights 34 may be colored with a color selected to be different from the colors used for other vehicle lights like red for brake lights, or emergency lights, such as blue used on law enforcement vehicles. Color schemes may also be implemented to signify seat belt use compliance. For example, a yellow light could designate proper seat belt use while a green light could signify improper use.

Figure 16:
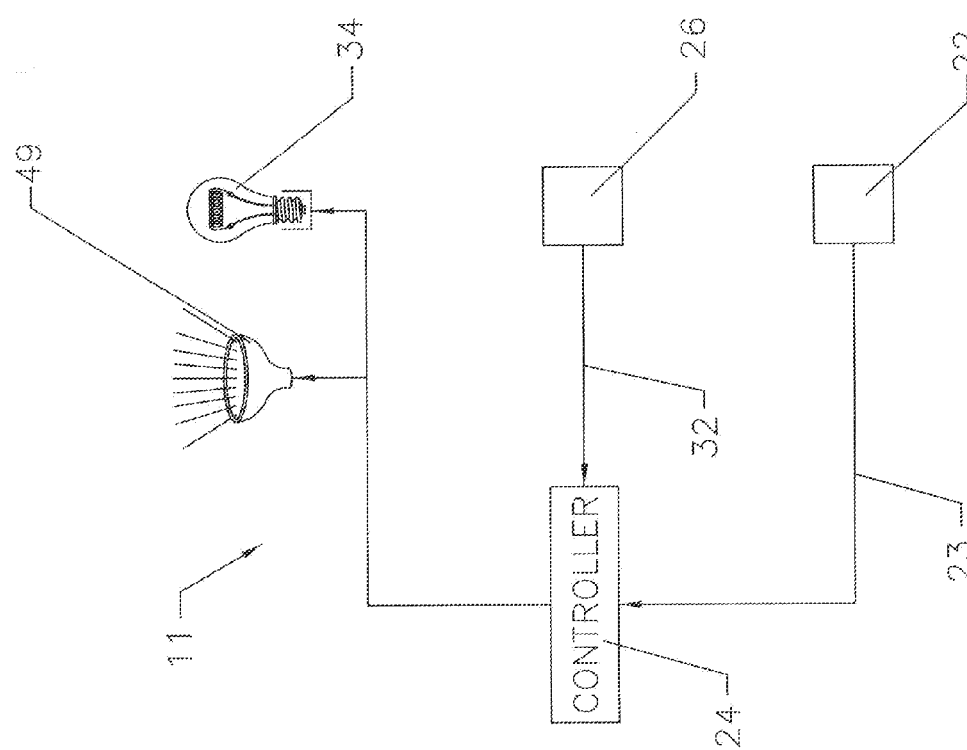
FIG. 16 is a schematic illustration of a vehicle seat belt use detection system including an external indicator light and integrated horn according to one embodiment of the disclosure.
Figure 17:
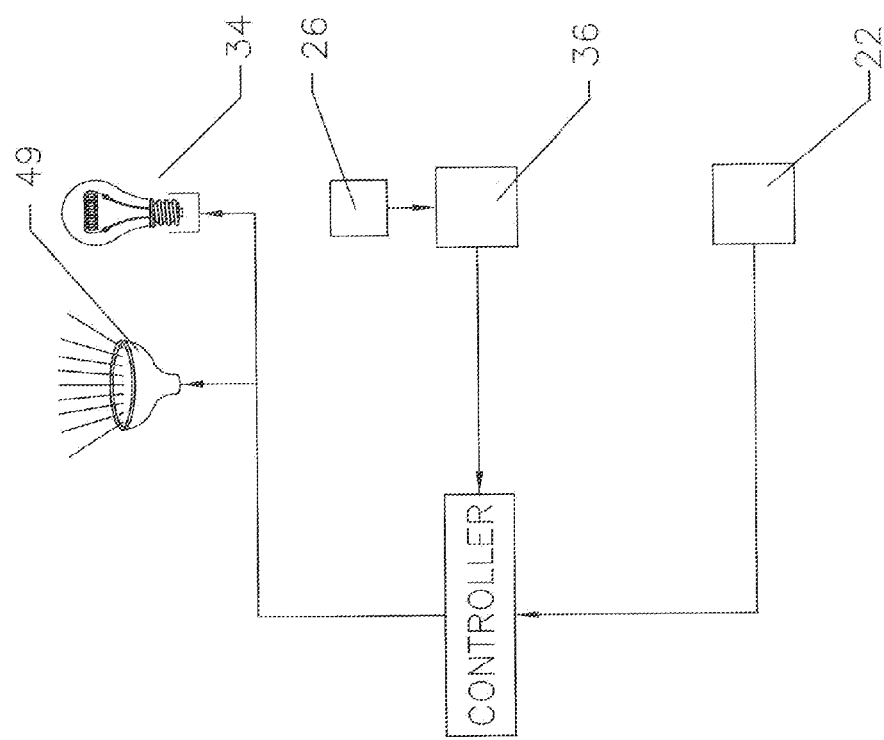
FIG. 17 is a schematic illustration of a vehicle seat belt use detection system including an external indicator light and integrated horn according to another embodiment of the disclosure.

An additional aspect is to integrate a horn or other sound device, e.g., a speaker, with the external light system to provide an audible approach for external monitoring of seat belt use. Incorporation of a horn 49 is shown in FIG. 16, which corresponds to the system shown in FIG. 2 with the addition of the horn being activated in conjunction with light 34. Incorporation of a horn 49 with the wireless system shown in FIG. 2A is shown in FIG. 17. Again, horn 49 is activated in conjunction with light 34 in this alternate aspect. The sound device, such as horn 49, may emit the sound warning from either inside or outside the motorized vehicle. In one aspect, the sound device emits repeating intermittent sounds when a seat belt of an occupied seat is not engaged. In another aspect, a continuous sound is emitted while the seat belt is not engaged. In a further aspect, the sound emitted due to a disengaged seat belt may undulate or pulsate in a regular or irregular fashion to attract the attention of the automobile passengers and individuals monitoring seat belt use from the exterior.

Figure 18:
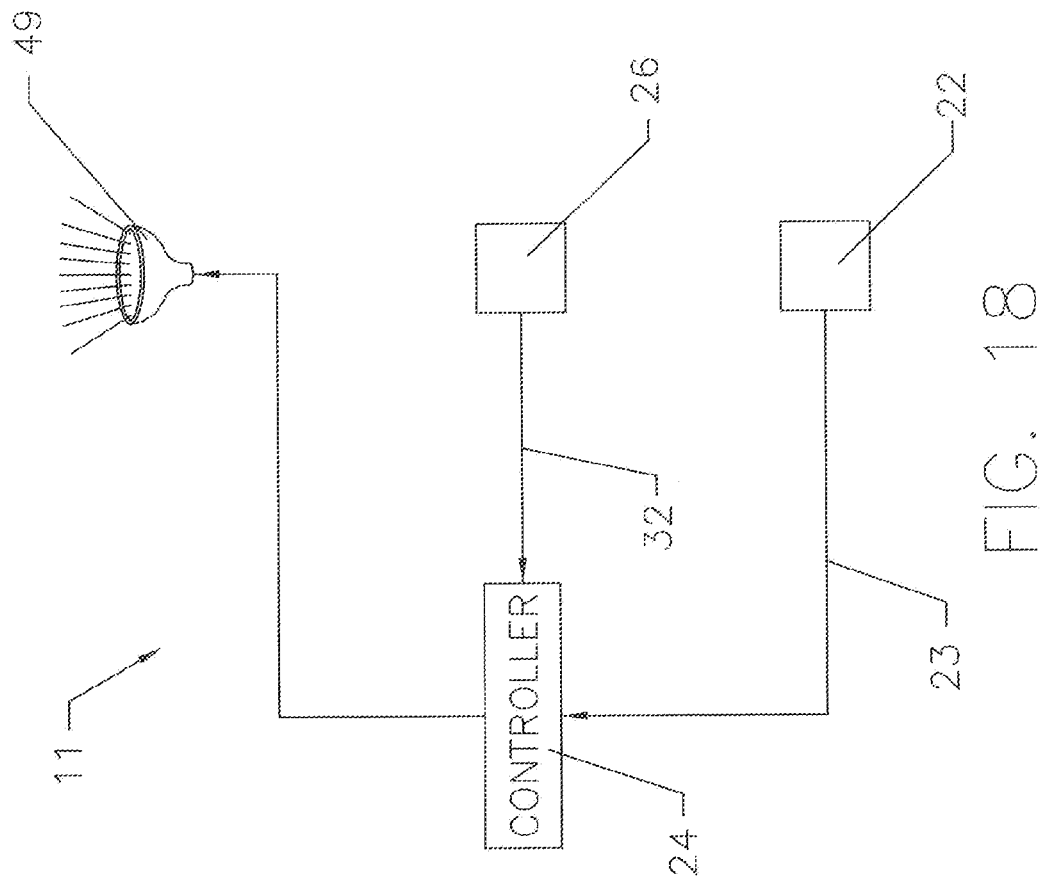
FIG. 18 is a schematic illustration of a vehicle seat belt use detection system including an externally audible indicator horn according to one embodiment of the disclosure.

In an alternate aspect shown in FIG. 18, horn 49 is placed in substitution of light 34 of the system shown in FIG. 2. In FIG. 19, horn 49 is placed in substitution of light 34 of the wireless system shown in FIG. 2A so as to be independent of the light system and take the place of the lights in the seat belt monitoring system disclosed herein.

Referring to FIGS. 7-10, a series of external lights shapes and configurations are shown. FIG. 7 shows a seat belt use light that mimics a conventional seat belt sign in current use. FIG. 8 shows light 34 in the shape of an oval. FIG. 9 shows light 34 in the shape of a square or rectangle. FIG. 10 shows light 34 in the shape of a modified x. It should be understood and apparent that light 34 may be configured in any regular or irregular geometric shape and may conform to government regulated shapes and/or sizes.

An additional aspect is to include a RFID device to emit an RF signal that can be detected by an RFID reader to provide seat belt status information. It is contemplated that the RFID system will mimic that currently in use and known as the EZ-PASS® system used at toll booths for highway usage collections. The RFID device is connected to the central processor and configured so as to send a signal when a seat belt is properly engaged or improperly disengaged. The signal may be standardized to indicate either proper seat belt usage or improper seat belt usage. Radio frequencies emitted may be unique to a specific seat or common to all seats in a vehicle. The RF signals sent may or may not be coordinated with any seat belt monitoring system situated in the interior of the vehicle.

Figure 12:
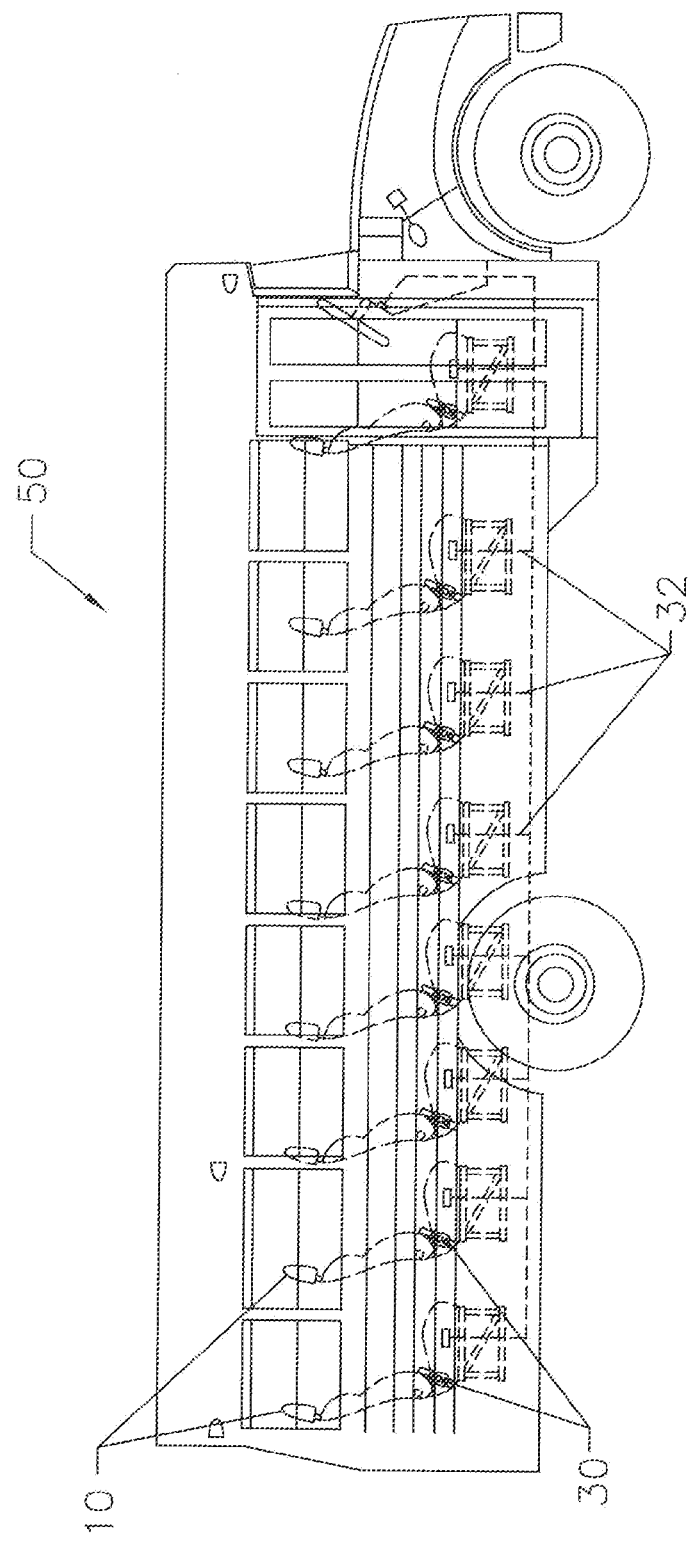
FIG. 12 shows a school bus with seats and seat belt monitoring system in phantom according to an embodiment of the disclosure.
Figure 13:
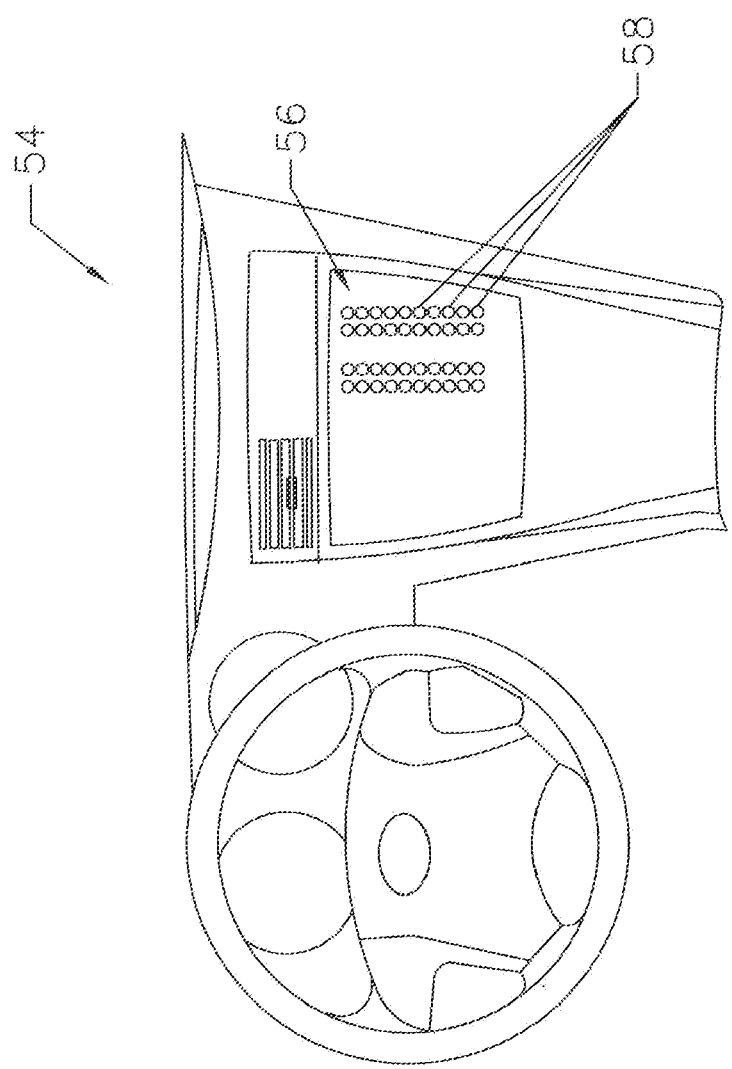
FIG. 13 shows a school bus dash board according to an embodiment of the disclosure.

The seat belt use detection system described herein is intended for implementation in any vehicle used to carry passengers including illustratively boats, trains, buses (commercial and school), cars, vans, SUV's and trucks. As shown in FIG. 12, the system can be implemented for internal monitoring, such as in a school bus, shown generally as 50, to ensure children seated in the bus are properly using any passenger restraint systems incorporated into the bus. Seats 10 include corresponding seat belts with seat belt buckles 30, which include sensor 26. When a seat belt is properly fastened, signal 32 is sent to a light panel 56 as shown in FIG. 13 by systems such as that shown in FIGS. 2, 2A and 3. Light panel 56 may be integrated into a bus dashboard 54 for ease of reference for the driver. In an alternative embodiment, light panel 56 may be installed as a stand alone panel, separate from the dashboard.

Light panel 56 includes a light 58 for each seat belt in the bus. The lights may be arranged to correspond to the arrangement of seats and seat belts in the bus for ease of reference. A single light 56 may designate a single bench seat with multiple seat belts or each individual seat belt. Additionally, each light 58 may have a seat designation assigned to it, which are used in commercial buses, in particular. The interior monitoring system may be used in any vehicle, (personal or commercial), watercraft, aircraft and the like.

With respect to commercial passenger aircraft, there is a bona fide need to monitor seat belt usage, particularly during travel through turbulent air when an aircraft can be violently tossed about causing passengers without seatbelts properly fastened to be violently jettisoned from their seats and potentially injured. To solve this dilemma, the invention can be employed in aircraft seats and either hardwired or wirelessly connected to a common panel (in accordance with the various options described above in connection with motor vehicle systems) with each seat belt monitor connected to a dedicated light as shown in FIGS. 14 and 15.

Figure 14:
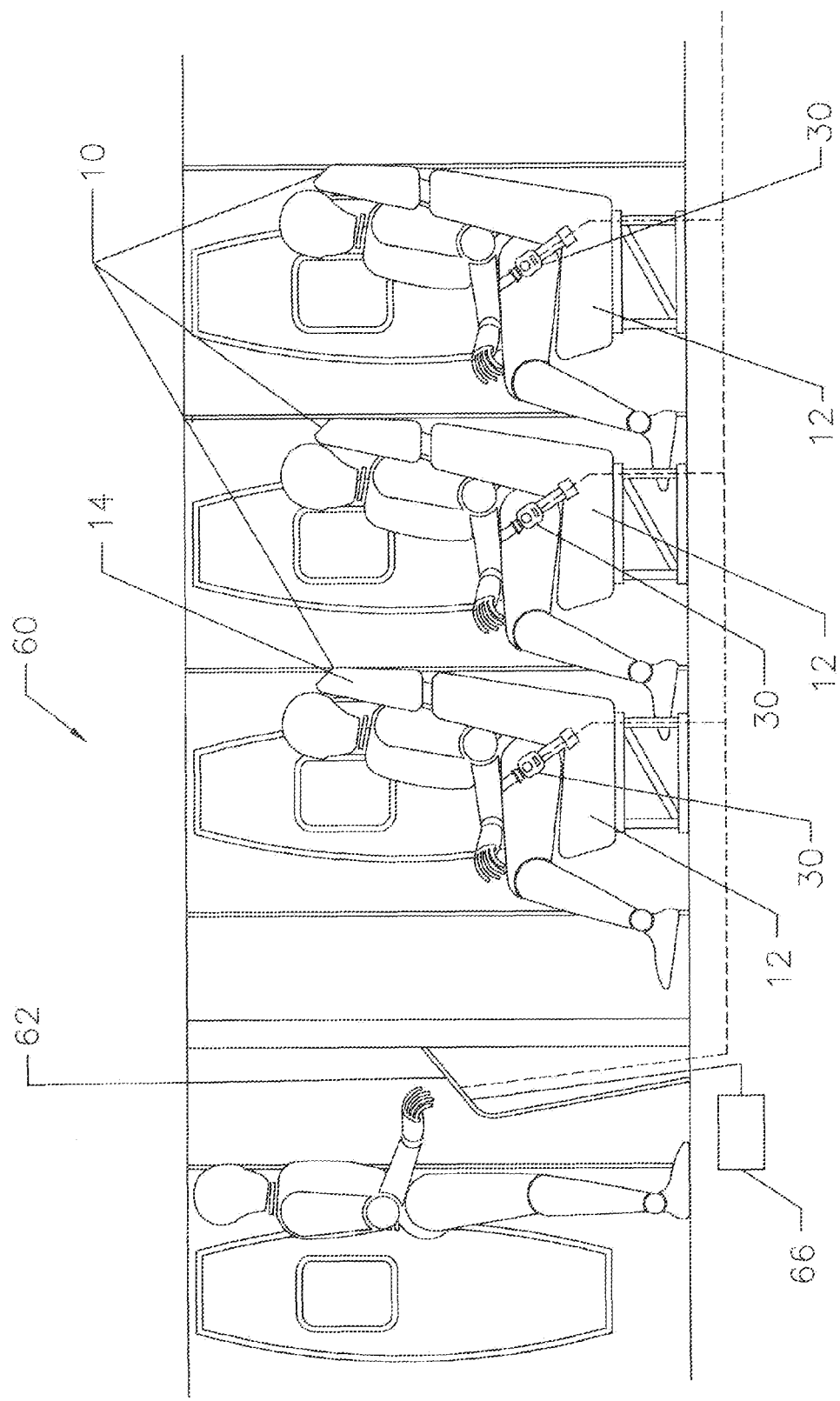
FIG. 14 shows a partial sectional view of an aircraft cabin with a seat belt monitoring system, signals in phantom, according to an embodiment of the disclosure.
Figure 15:
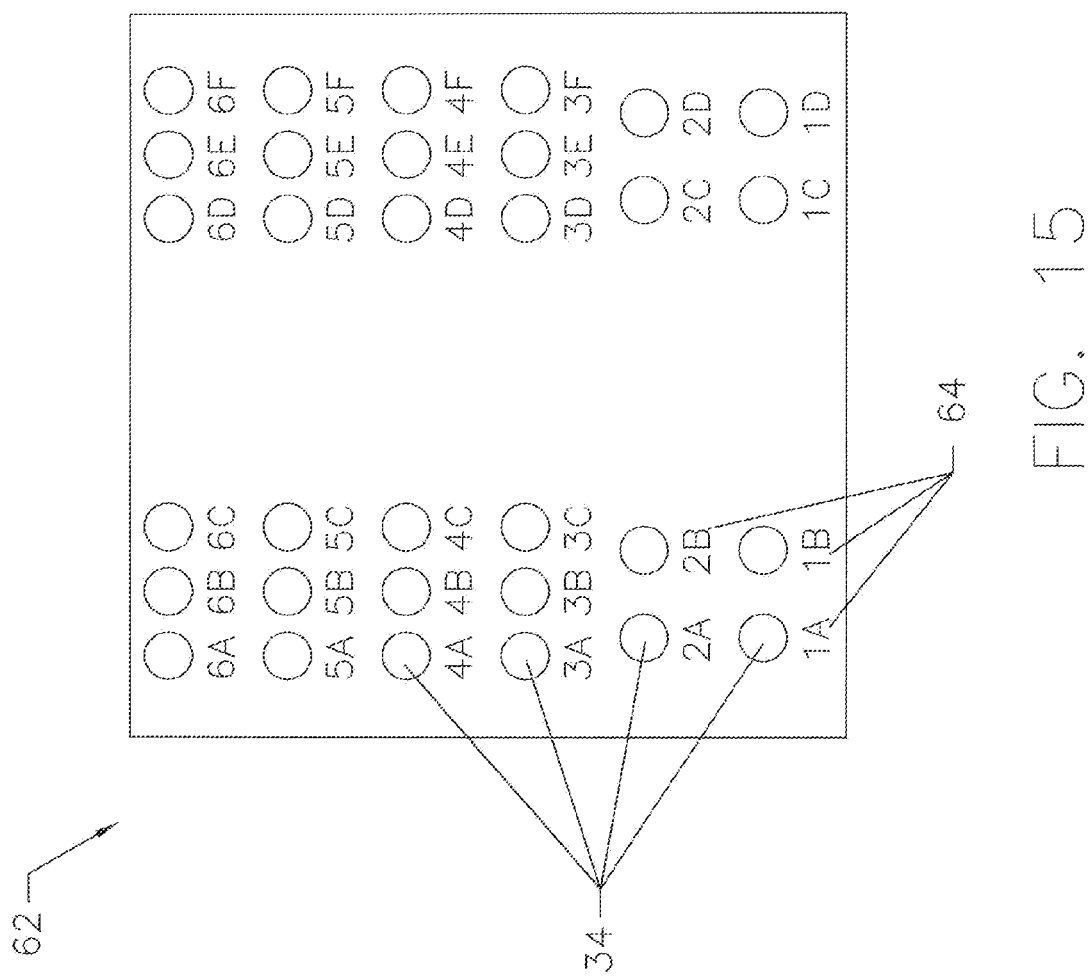
FIG. 15 shows an aircraft seat belt monitoring console according to an embodiment of the disclosure.

Referring to FIG. 14, aircraft cabin 60 includes a plurality of seats 10 each with a dedicated seat belt assembly including seat belt buckle 30. A sensor (such as sensor 26 in FIG. 2) is embedded in buckle 30 and transmits a signal 32 to a seat belt use monitor panel 62. Signal 32 may be sent via hardwire connection or wirelessly in the same manner as hereinbefore described for the vehicle seat. Referring to FIG. 15, panel 62, in one embodiment, includes a plurality of lights 34 that correspond to each seat belt in the aircraft. Optionally, an alpha-numeric designation 64 is assigned each light 34 to represent the correspondingly assigned seat designation as is common with passenger aircraft. In this manner, aircraft personnel may identify passengers not in compliance with the current seatbelt use requirement and seek compliance with the aircraft's PA system or one-on-one instruction. In an alternative embodiment, a single light 34 connected to all the seat belt use sensors in the aircraft indicates group compliance or lack of compliance based on the compliance status of each individual user. If one user has not properly secured a seat belt, light 34 will be activated (or deactivated if deactivation signifies improper use).

The system may further be connected to an aircraft's "black box," shown generally as 66 in FIG. 14, to make a permanent record of seat belt use during the course of a flight. In addition to lights, a bell tone device or other audible device can be installed in the common panel to provide an audible alert in the event the panel cannot be visually inspected at any given time. The panel can be placed in any location in an aircraft including the cockpit and flight attendant seating areas.

In another aspect, the system may further incorporate one or more sensors per seat that detect the status of the seat backs of each seat, i.e., in an upright or inclined position. Like the seatbelt sensor, a signal is sent by the seat back status sensor via hardwire or wireless transmission (such as that described herein for a vehicle), to a console for remote monitoring. The light and/or audible devices in the console for remotely providing information about the seat back status may be separate from those indicating seat belt status or integrated with the light and/or audible devices for the seat belts.

In a still further aspect, light or audible devices (such as bell tones and buzzers), dedicated to a single seat are placed in the ceiling above the seat or at some other location adjacent to the seat to provide localized notification of a seat back that is not in an upright position when required. The seat back and seat belt sensing systems are the same as those described herein except that the notification light(s)/audible device(s) are situated in close proximity to the seat in question. The same or similarly dedicated lights or audible devices can also be placed in the ceiling above or at some other location adjacent to a particular seat to provide localized notification of seat belt use status. With either the seat back lights or the seat belt use lights, the lights may flash or maintain relatively constant intensity to alert the seat user of the need to buckle the seat belt or move the seat back to the upright position. The lights and audible devices also provide an attendant with localized information of the seat back and seat belt use status. The localized lights and/or audible devices may be coordinated with or independent of the console lights and/or audible devices.

The system described herein provides a way to monitor seat belt use from the exterior of a vehicle (or internally in the case of a commercial passenger aircraft as shown in FIGS. 13-15), regardless of the type of vehicle within which the system is implemented. When a person sits in a vehicle seat and engages the corresponding seat belt, signals are emitted from sensors in the seat and seat belt buckling system and sent to a controller for processing. The controller processes the signals and determines whether a seat belt is properly being used. If proper use is determined, a signal is emitted by controller 24 to activate external light 34, which, in this embodiment, signifies proper seat belt use. Should a seat be occupied, but the corresponding seat belt not engaged, the signals sent to controller 24 are processed to determine improper seat belt use and a corresponding signal is not emitted by controller 24 to activate external light 34, which, in this example, signifies improper use.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What we claim as new and desire to secure by United States Letters Patents is:

1. An apparatus for externally monitoring the status of seat belt use in a vehicle comprising:
   a plurality of seats including front and rear seats;
   a plurality of vehicle seat occupancy detection devices each positioned inside one of the plurality of seats;
   a plurality of seat belts each secured to one of the plurality of seats, wherein each seat belt has a tongue and a belt buckle, wherein the tongue is configured to engage the belt buckle;
   a plurality of seat belt sensors, each positioned in a single belt buckle for sensing the engagement of the tongue to the belt buckle; and
   a seat belt use indication light positioned on the exterior of the vehicle and connected to the plurality of seat occupancy detection devices and the plurality of seat belt sensors, wherein the indication light is in an off position if no seat is occupied, wherein the indication light is activated when at least one of the plurality of detection devices detects a person seated in one of the plurality of seats, wherein the indication light is activated to emit a first color when the seat is occupied and the tongue is engaged with the belt buckle, and wherein the indication light is activated to emit a second color when the seat is occupied and the tongue is not engaged with the belt buckle.

2. The apparatus of claim 1 wherein at least one of the occupancy detection devices relays a signal to a seat use monitoring system when an individual occupies the seat.

3. The apparatus of claim 1 further comprising a plurality of seat belt use indication lights, wherein each light is dedicated to one of the plurality of seats.

4. The apparatus of claim 3 wherein the plurality of lights are arranged on the exterior of the vehicle in an arrangement substantially similar to the arrangement of the plurality of seats.

5. The apparatus of claim 1 wherein the plurality of seat belt sensors are wirelessly connected to the indication light.

6. The apparatus of claim 5 wherein each sensor includes a transmitter located in the seat belt buckle, wherein the transmitter sends a wireless signal to the indication light when the sensor is triggered by engagement of the tongue to the belt buckle.

7. The apparatus of claim 6 wherein the transmitter is a tuned circuit that transmits a wireless signal at one or more selected frequencies.

8. The apparatus of claim 5 wherein the the plurality of seats each with a seat occupancy detection device and a seat belt having a tongue and a belt buckle, the tongue and the belt buckle having a sensor and a transmitter, respectively.

9. The apparatus of claim 8 wherein each transmitter transmits a wireless signal at a frequency different from the other transmitters.

10. The apparatus of claim 1 wherein the indication light is positioned on a rear portion of the vehicle.

11. The apparatus of claim 1 wherein the indication light is positioned on the side or front of the vehicle.

12. The apparatus of claim 1 further comprising a controller, wherein the sensors sends signals to the controller to indicate the status of each seat belt use.

13. The apparatus of claim 12 wherein the controller is configured to send a signal to the indication light.

14. The apparatus of claim 12 wherein the controller comprises a receiver and the sensors each comprise a transmitter for transmitting signals to the receiver.

15. The apparatus of claim 14 wherein each transmitter sends a signal to the receiver to indicate the status of seat belt use.

16. The apparatus of claim 12 wherein the controller is wirelessly connected to the indication light.

* * * * *